US010984592B2

(12) United States Patent
Dedhia (10) Patent No.: US 10,984,592 B2
(45) Date of Patent: Apr. 20, 2021

(54) SPATIAL DECOMPOSITION-BASED REPAIR OF DEFECTS IN BOUNDARY REPRESENTATIONS

(71) Applicant: Siemens Industry Software Inc., Plano, TX (US)

(72) Inventor: Hiren Dedhia, Santa Ana, CA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/527,674

(22) Filed: Jul. 31, 2019

(65) Prior Publication Data
US 2021/0035361 A1    Feb. 4, 2021

(51) Int. Cl.
*G06T 17/20*     (2006.01)
(52) U.S. Cl.
CPC .................. *G06T 17/205* (2013.01)
(58) Field of Classification Search
CPC .................................................. G06T 17/205
See application file for complete search history.

(56) References Cited

U.S. PATENT DOCUMENTS

| 6,016,153 A | 1/2000 | Gueziec et al. |
| 8,130,221 B2 | 3/2012 | Voth |

| 2006/0170678 A1* | 8/2006 | Ahn | G06T 17/205 345/423 |
| 2007/0297645 A1* | 12/2007 | Pace | G06K 9/6203 382/103 |
| 2018/0031721 A1* | 2/2018 | Etiene Queiroz | G06T 17/05 |

FOREIGN PATENT DOCUMENTS

CN     102930091 B     2/2013

OTHER PUBLICATIONS

Bischoff et al. Structure Preserving CAD Model Repair, Dec. 2005, 1-10 (Year: 2005).*
Duke Computer Science, "Spatial Decomposiiton", Computer Graphics, Data Structures, CPS124, 296, https://www.cs.duke.edu/courses/cps124/spring04/notes/12_datastructures/notes.pdf [retrieved from Internet on Jul. 18, 2019], 6 pgs.

* cited by examiner

*Primary Examiner* — Robert J Craddock (57) ABSTRACT

A computing system may include a mesh access engine and a mesh repair engine. The mesh access engine may be configured to access a boundary representation of an object design, the boundary representation including a defect. The mesh repair engine may be configured to repair the boundary representation, including by converting the boundary representation into a spatial decomposition representation of the object design and converting the spatial decomposition representation of the object design back into a boundary representation form to obtain a repaired boundary representation of the object design.

18 Claims, 5 Drawing Sheets

SPATIAL DECOMPOSITION-BASED REPAIR OF DEFECTS IN BOUNDARY REPRESENTATIONS

BACKGROUND

Computer systems can be used to create, use, and manage data for products and other items. Examples of computer systems include computer-aided design (CAD) systems (which may include computer-aided engineering (CAE) systems), computer-aided manufacturing (CAM) systems, visualization systems, product data management (PDM) systems, product lifecycle management (PLM) systems, and more. These systems may include components that facilitate the design, configuration, and simulated testing of product structures and product manufacture.

BRIEF DESCRIPTION OF THE DRAWINGS

Certain examples are described in the following detailed description and in reference to the drawings.

DETAILED DESCRIPTION

Modern computing systems may utilize boundary representations to represent object shapes. A boundary representation may refer to any geometric or topological description of an object boundary. As such, a boundary representation may include surface geometry in the form of surfaces, curves, points, edges, vertices, and the like. As an example boundary representation, a surface mesh (also referred to as a polygon mesh) may include a set of vertices and edges that form a plurality of mesh facets, polygons, or surfaces. The plurality of mesh facets may together form the boundary of a 3D object. Aside from meshes, other forms of boundary representations are contemplated herein as well, including any number of 2D or 3D boundary representations.

Generation and maintenance of boundary representations can be computationally difficult. Many mesh models (including those imported from other systems) may include defects. Mesh defects may also be introduced during mesh construction, whether caused by errors in a mesh-generation algorithm, incomplete or inaccurate base data (e.g., low-quality or low-resolution 3D image scans), and the like. Furthermore, maintaining the integrity of mesh boundaries can be challenging, especially for complex shapes or high-resolution meshes. Mesh defects and poor-quality meshing may reduce the effectiveness or robustness of solid modeling and CAD operations. Such issues can similarly affect other forms of boundary representations as well.

Manual repair of defects in boundary representations can be cumbersome, time-consuming, and error-prone. For example, different types of defects may require custom actions to specifically address a given defect. Defect identification (e.g., of gashes/slits, overlapping facets, etc.) may require specialized identification processes and applying specially tailored repairs to the specific portion of a mesh at which identified defects are located. Defect-specific repair methods can involve recognition of specific defect symptoms and utilizing tailored repair models to add or remove mesh facets, many of which are computationally intensive and inefficient. In some cases, surface mesh repair can require performance of multiple different defect identification and custom repair processes, each with its own latency, parameters, and computational requirements.

The disclosure herein may provide systems, methods, devices, and logic for spatial decomposition-based repair of defects in boundary representations. As described in greater detail below, the spatial decomposition-based repair features disclosed herein may provide an automated and robust defect repair capability with increased efficiency and speed. In particular, defect repair may be performed by converting a boundary representation into a spatial decomposition representation and then back into a boundary representation. In doing so, the features described herein may provide a robust mechanism to repair defects in meshed models at a fixed computational cost that may be (at times, significantly) lower than manual repair mechanisms or defect-specific models. Moreover, the spatial decomposition-based repair features disclosed herein may be defect-agnostic, supporting defect repair without particularized identification of specific defects or pinpointing defect locations. As such, the spatial decomposition-based repair features may provide increased defect repair capabilities for multiple different defect types, and may do so with reduced computational costs and latency as compared to other defect-specific repair processes.

These and other spatial decomposition-based repair features and technical benefits are described in greater detail herein.

Figure 1:
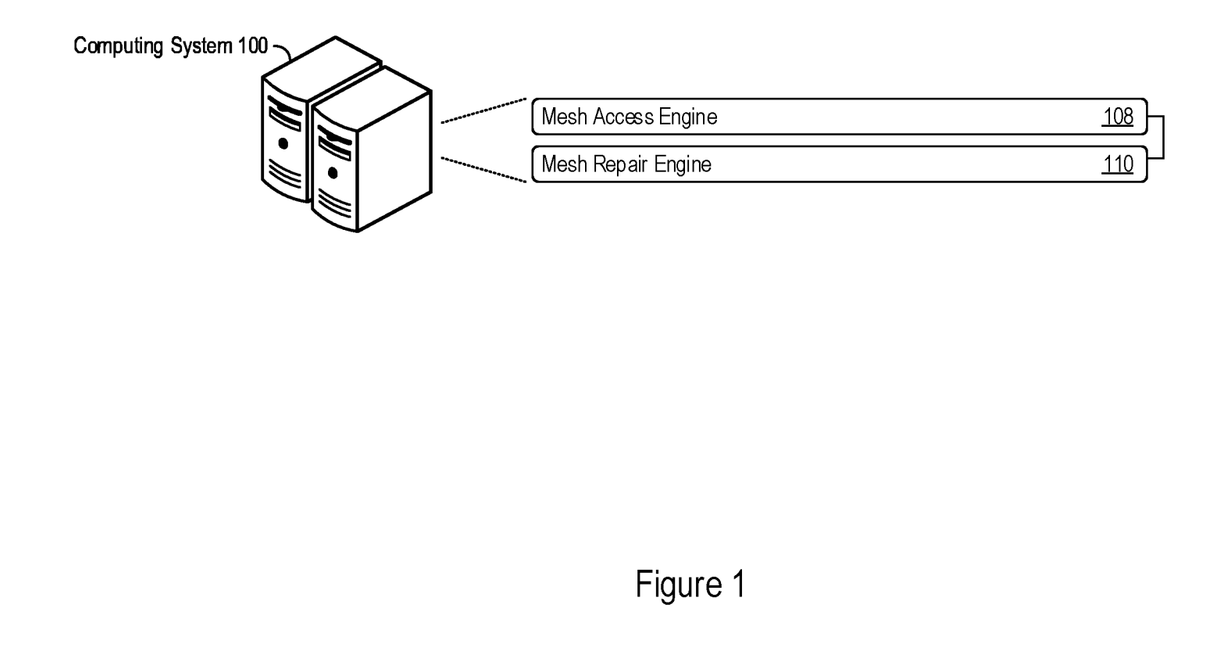
FIG. 1 shows an example of a computing system that supports spatial decomposition-based repair of defects in boundary representations.

FIG. 1 shows an example of a computing system 100 that supports spatial decomposition-based repair of defects in boundary representations. The computing system 100 may take the form of a single or multiple computing devices such as application servers, compute nodes, desktop or laptop computers, smart phones or other mobile devices, tablet devices, embedded controllers, and more. In some implementations, the computing system 100 implements or is part of a CAD system that supports the design, simulation, or processing of CAD data, including boundary representations of object designs.

As an example implementation to support any combination of the spatial decomposition-based repair features described herein, the computing system 100 shown in FIG. 1 includes an mesh access engine 108 and a mesh repair engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the mesh access engine 108 may access a boundary representation of an object design. The accessed boundary representation may include any number of defects. In operation, the mesh repair engine 110 may repair the boundary representation, including by converting the boundary representation into a spatial decomposition representation of the object design and converting the spatial decomposition representation of the object design back into a boundary representation form to obtain a repaired boundary representation of the object design.

These and other spatial decomposition-based repair features according to the present disclosure are described in greater detail next. Many of the examples described herein using a surface mesh as an example form of a boundary representation. However, the spatial decomposition-based repair features described herein may be consistently applied for any type of boundary representation of any dimension (e.g., 2D faces, surfaces, curves, other 3D boundary representation forms, and the like).

Figure 2:
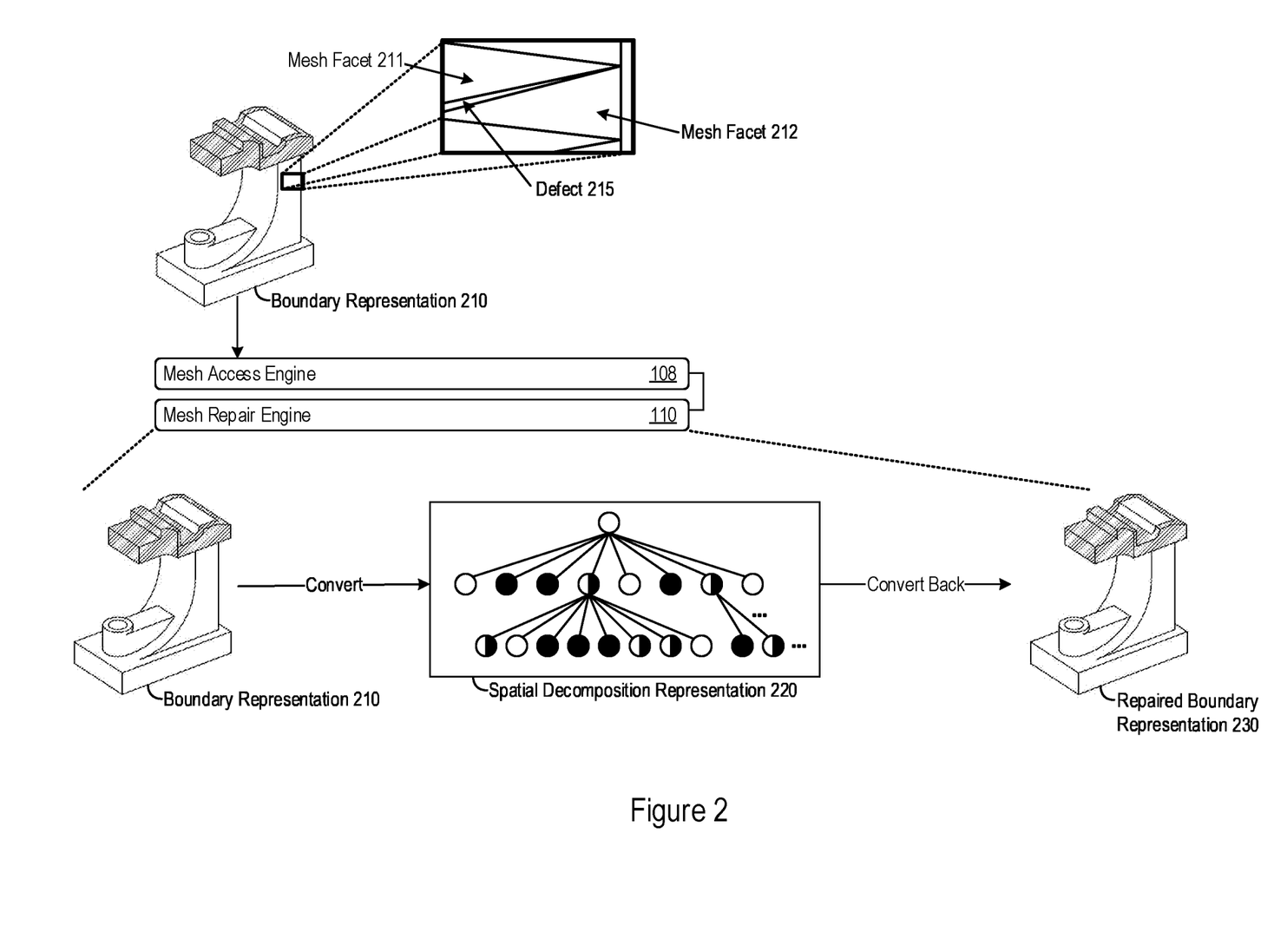
FIG. 2 shows examples of spatial decomposition-based repairs that a computing system may perform for a boundary representation.

FIG. 2 shows examples of spatial decomposition-based repairs that a computing system may perform for a boundary representation. In the particular example shown in FIG. 2, a computing system is illustrated in the form of a mesh access engine 108 and a mesh repair engine 110. However, other system implementations are contemplated herein.

To support spatial decomposition-based repair, the mesh access engine 108 may access a boundary representation 210. The boundary representation 210 may be in the form of a surface mesh or other mesh geometry. In FIG. 2, some of the object surfaces of a boundary representation 210 are shown, but note that the boundary representation 210 in FIG. 2 is not illustrated with all of the detailed mesh faceting that may be included as part of a surface mesh.

The boundary representation 210 accessed by the mesh access engine 108 may include any number of defects. A defect may refer to any imperfection in a boundary representation, some examples of which are described in greater detail herein. To provide an illustrative example, a small section of the boundary representation 210 is enlarged in FIG. 2 that depicts portions of a mesh facet 211 and a mesh facet 212. The enlarged section of the boundary representation 210 also illustrates the defect 215, which may be a slit or gash defect with a size smaller than a mesh resolution of the boundary representation 210. Other examples of defects that may be present in the boundary representation 210 include inconsistently oriented facets (e.g., with incorrectly assigned facet orientations, such as neighboring facets with orientations that are normal to one another), non-manifold facets (e.g., that may include various categories of un-manufacturable facets, such as two facets that intersect at a single point, etc.), overlapping facets (e.g., two facets that intersect beyond facet edges or folded facets), or any combination thereof.

The mesh repair engine 110 may repair any number of defects in the boundary representation 210, including the defect 215. To do so, the mesh repair engine 110 may convert the boundary representation 210 (in a boundary representation form) into a spatial decomposition representation 220. In contrast to a boundary representation, a spatial decomposition representation may represent a volume or space in discretized units and specify whether the discretized units are filled (whether partially or in whole) or not. Accordingly, the mesh repair engine 110 may convert the boundary representation 110 into the spatial-decomposition representation 220 by mapping the boundary representation 210 into a 3D space, discretizing the 3D space into 3D units (e.g., voxels), and representing the 3D space that includes the boundary representation 210 into a spatially-decomposed form.

In converting the boundary representation 210, the mesh repair engine 110 may apply any number of spatial-decomposition operations, algorithms, processes, or computations. In some implementations, the mesh repair engine 110 may convert the boundary representation 210 by discretizing a 3D space to a given discretization resolution and testing if discretized points or elements are on the object boundary, doing so to generate a spatial shell. Also, the type of spatial-decomposition operations applied by the mesh repair engine 110 may depend on the form of the spatial-decomposition representation 220 (which may be a configurable parameter). In the example shown in FIG. 2, the mesh repair engine 110 converts the boundary representation 210 into a spatial decomposition representation 220 in the form of an oct-tree. However, other spatial decomposition forms are contemplated herein, such as quad trees, spatial occupation enumeration, exhaustive enumerations, binary space partition (BSP) trees, and more. Any type of spatial decomposition algorithm or process is supported by the mesh repair engine 110 for converting the boundary representation 210 to the spatial decomposition representation 220.

The mesh repair engine 210 may remove the defect 215 (and various other mesh defects) through the converting of the boundary representation 210 into the spatial decomposition representation 220. This may be the case as many defects specific to meshes and other boundary representations are not present or do not exist in spatial decomposition representations. For instance, slit and gash defects smaller than the discretization resolution used for the spatial decomposition conversion may no longer appear in the spatial decomposition representation 220. In a similar manner, the mesh repair engine 110 may remove any miniscule mesh imperfections that are smaller than the discretization resolution via converting the boundary representation 210 into the spatial decomposition representation 220, as such imperfections simply will be not represented in the spatial decomposition representations 220.

As another example of defect repair via spatial decomposition, the mesh repair engine 110 may remove folded facet defects and inconsistently oriented facet defects via the boundary representation conversion through spatial decomposition. This may be the case as the orientation of facets is not used in the computation of the spatial shell to produce the spatial decomposition representation 220. Explained in another way, the spatial decomposition representation 220 need not track orientation characteristics of meshes, facets, or surface geometries. As such, the mesh repair engine 110 may construct the spatial decomposition representation 220 from the boundary representation 210 regardless of and without tracking/maintaining any erroneous facet orientations.

As yet another example, non-manifold defect conditions may be a property specific to boundary representations. Non-manifold conditions or defects do not exist in spatial decomposition representations, and thus a conversion to the spatial decomposition representation 220 by the mesh repair engine 110 may, in effect, remove non-manifold defects from the object design as represented in the spatial decomposition representation 220.

In a general sense, the mesh repair engine 110 may remove defects from the boundary representation 210 by converting the boundary representation 210 into another form in which such defects do not exist, namely a spatial decomposition representation 220. The mesh repair engine 110 may thus obtain a representation of the object design (albeit in a different, spatial form) in which slit and gash defects, non-manifold defects, folded facet defects, and inconsistently oriented facet defects no longer exist or apply. Accordingly, the mesh repair engine 110 may construct a spatial shell via spatial decomposition in the form of a spatial decomposition representation 220 that is free from the defects that often plague boundary representations.

With a constructed spatial shell that is free of defects, the mesh repair engine 110 may convert the spatial decomposition representation 220 back into a boundary representation form (e.g., a mesh) to obtain a repaired boundary representation 230. To do so, the mesh repair engine 110 may use any number of spatial decomposition representation-to-boundary representation processes or algorithms. As illustrative examples, the mesh repair engine 110 may use marching cubes, dual contouring, or other boundary representation generation algorithms to construct the repaired boundary representation 230. The source data from which the repaired boundary representation 230 is generated (in this case, the spatial decomposition representation 220) may be free of boundary representation-specific defects. As such, the output boundary representation (that is, the repaired boundary representation 310) may likewise be free from the defects that were present in the input boundary representation 210. As such, the mesh repair engine 110 may repair the defect 215 (present in the boundary representation 210) such that the defect 215 is not present in the repaired boundary representation 230.

Note that the mesh repair engine 110 can repair the boundary representation 210 and generate the repaired boundary representation 230 without expressly identifying the defect 215 in the boundary representation 210. That is, the mesh repair engine 110 need not specifically identify the defect 215 in the boundary representation 210 to repair the boundary representation 210. In a similar manner, the mesh repair engine 110 may repair the boundary representation 210 without determining a location of the defect 215 in the boundary representation 215. As such, the spatial decomposition-based repair features described herein may provide a more efficient, automated, and accurate mechanism to repair meshes and other boundary representations as compared to defect-specific repair models that only address or focus on specific defective portions of a boundary representation.

Note also that the mesh repair engine 110 is capable of generating the repaired boundary representation 230 to be meshed differently from the boundary representation 210. In that regard, the mesh repair engine 110 need not focus on repairing specific defective portions of an input boundary representation, and may instead generate a completely new boundary representation to model an object design, one without the defects present in the input boundary representation. Accordingly, the repaired boundary representation 230 converted from the spatial decomposition representation 220 may have a different facet (e.g., triangle or quadrilateral) count, different meshing layouts, a different mesh resolution from the boundary representation 210, or any combination thereof. Such features are described next in connection with FIG. 3.

Figure 3:
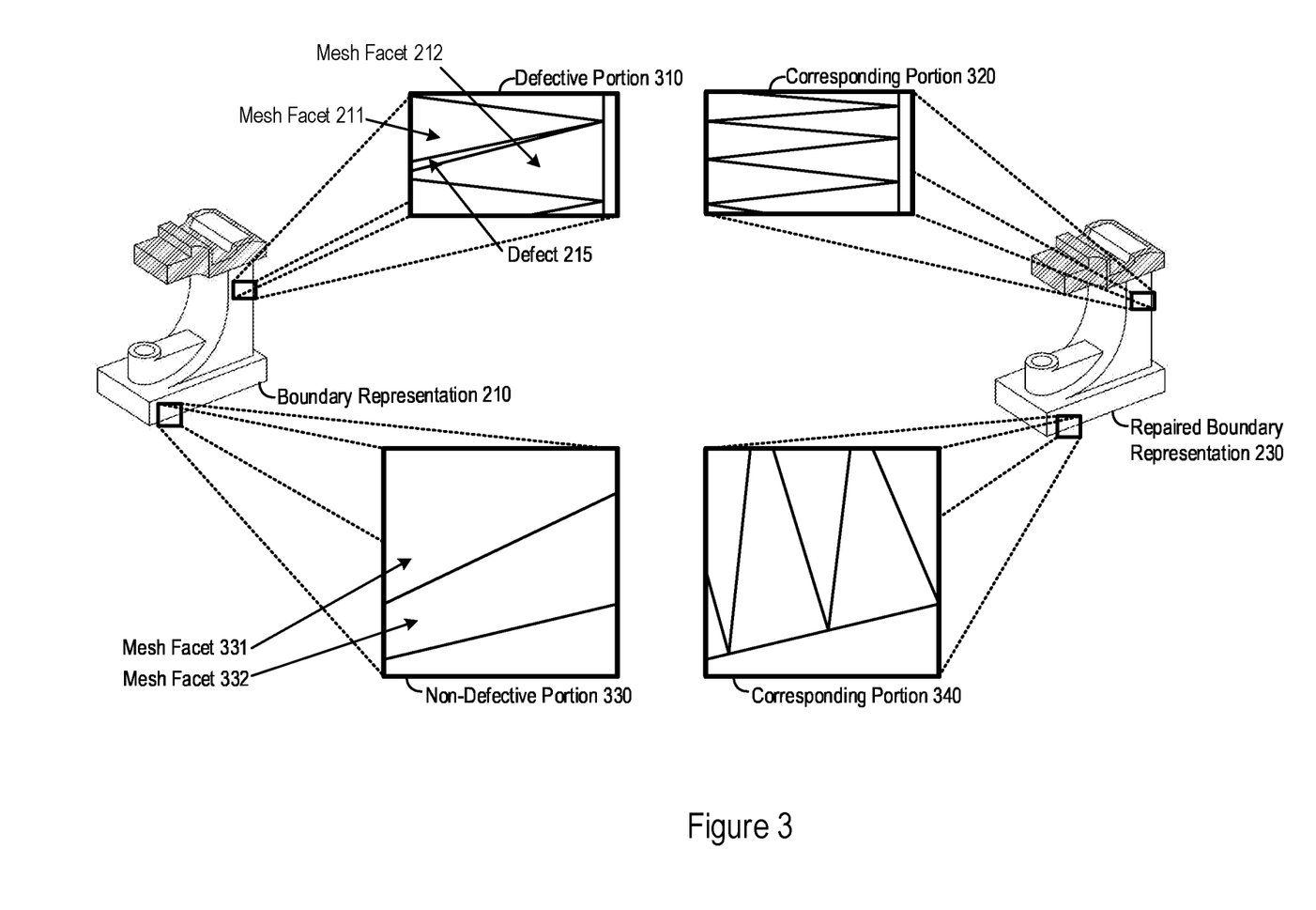
FIG. 3 shows an example differences between a boundary representation and a repaired boundary representation generated by a mesh repair engine.

FIG. 3 shows an example differences between a boundary representation and a repaired boundary representation generated by the mesh repair engine 110. In particular, FIG. 3 illustrates the boundary representation 210 and the repaired boundary representation 230 described in FIG. 2, and further depicts various portions of the boundary representation and corresponding portions of the repaired boundary representation 230 to illustrate differences between the boundary representations that may result from spatial decomposition-based repairs. As shown in FIG. 3, the boundary representation 210 and repaired boundary representation 310 may be the same form (e.g., both as surface meshes), but differ in their specific implementation (e.g., in their meshing).

A defective portion 310 of the boundary representation 210 is shown in FIG. 3, which includes mesh facets 211 and 212 as well as a defect 215. FIG. 3 also illustrates a corresponding portion 320 of the repaired boundary representation 230 that covers the same portion of the object design as the defective portion 310. As the mesh repair engine 110 may generate the repaired the repaired boundary representation 230 from a spatial decomposition representation, the corresponding portion 320 (and the repaired boundary representation 230 itself) may be generated as an entirely different mesh from the defective portion 310 (and the boundary representation 210 overall).

Accordingly, the corresponding portion 320 of the repaired boundary representation 230 may be meshed differently (e.g., with a finer mesh resolution) than the defective region 310 of the boundary representation 210 that the corresponding portion 320 corresponds to. As seen in FIG. 3, the mesh facets 211 and 212 are no longer present in the corresponding portion 320, which includes (portions of) other mesh facets with a different mesh layout and the corresponding portion 320 is meshed at a finer mesh resolution than the defective portion 310. Even if meshed at the same mesh resolution, the corresponding portion 320 may nonetheless be meshed differently, e.g., with mesh faces of differing alignment, shapes, or configurations. As such, the mesh repair engine 110 may repair the boundary representation 210 and remove the defect 215 by generating an entirely new mesh for an object design.

As another example of such a mesh difference, a non-defective portion 330 of the boundary representation 210 is also illustrated in FIG. 3. The non-defective portion 330 includes the mesh facets 331 and 332, but does not include any mesh defects. Even so, the corresponding portion 340 of the repaired boundary representation 230 for the same portion of the object design is meshed differently from non-defective portion 330 of the boundary representation 210 (as seen in FIG. 3). Accordingly, the mesh repair engine 110 may take an input boundary representation 210 and repair the boundary representation 210 into the same form (e.g., also as a surface mesh), but in a different specific implementation.

As described herein, a computing system may repair defects present in a boundary representation through spatial decomposition. The spatial decomposition-based repair features described herein may support defect-agnostic repairs in that specific defects, defect types, and defect locations need not be identified in order to repair a boundary representation. Instead, spatially decomposing a boundary representation into a spatial decomposition representation may, in effect, provide a process to remove and repair defects in the boundary representation. Converting the spatial decomposition representation back into a(n albeit differently meshed) boundary representation may provide an output mesh (or other boundary representation) in the same form as a defective or poor quality mesh, but without slit and gash defects, non-manifold defects, inconsistently oriented facet defects, and the like. Accordingly, the spatial decomposition-based repair features described herein may provide a computationally fixed, efficient, elegant, and effective mechanism to repair meshes and other types of boundary representations.

Figure 4:
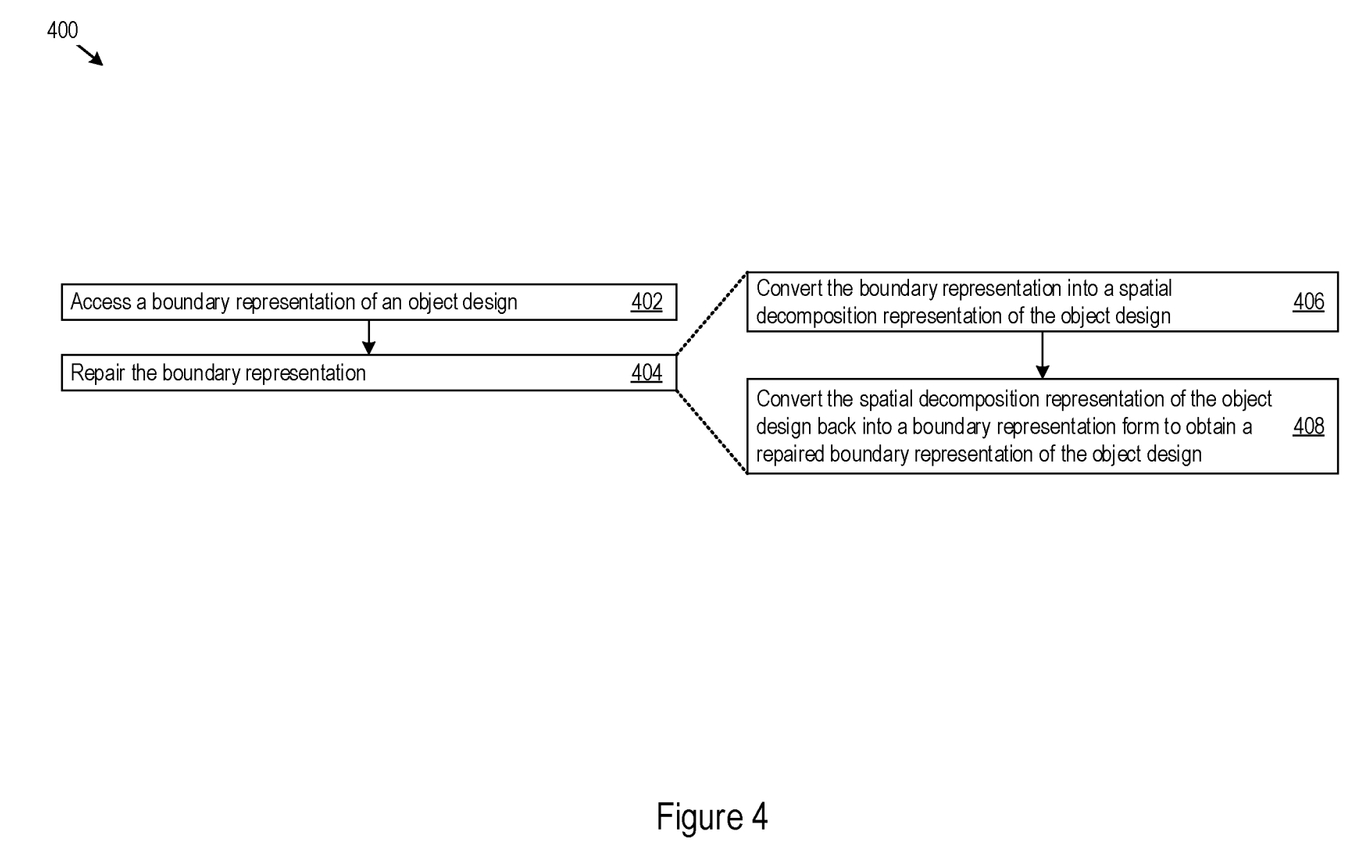
FIG. 4 shows another example of logic that a system may implement to support spatial decomposition-based repair of defects in boundary representations.

FIG. 4 shows another example of logic 400 that a system may implement to support spatial decomposition-based repair of defects in boundary representations. For example, the computing system 100 may implement the logic 400 as hardware, executable instructions stored on a machine-readable medium, or as a combination of both. The computing system 100 may implement the logic 400 via the mesh access engine 108 and the mesh repair engine 110, through which the computing system 100 may perform or execute the logic 400 as a method to support spatial decomposition-based repair of defects in boundary representations. The following description of the logic 400 is provided using the mesh access engine 108 and the mesh repair engine 110 as examples. However, various other implementation options by systems are possible.

In implementing the logic 400, the mesh access engine 108 may access a boundary representation of an object design (402). The accessed boundary representation may include any number of defects, for example slit or gash defects with size smaller than a mesh resolution of the boundary representation, inconsistently oriented facets, non-manifold facets, overlapping facets, or any combination thereof. As noted herein, such defects may be specific to boundary representations and caused by errors in mesh generation algorithms, inaccurate base data, and the like.

In implementing the logic 400, the mesh repair engine 110 may repair the boundary representation (404), including according to any of the spatial decomposition-based repair features described herein. For instance, the mesh repair engine 110 may convert the boundary representation into a spatial decomposition representation of the object design (406) and then convert the spatial decomposition representation of the object design back into a boundary representation form to obtain a repaired boundary representation of the object design (408).

The logic 400 shown in FIG. 4 provides illustrative examples by which a computing system 100 may support spatial decomposition-based repair of defects in boundary representations. Additional or alternative steps in the logic 400 are contemplated herein, for example according to any of the features described herein for the mesh access engine 108, the mesh repair engine 110, or any combinations thereof.

Figure 5:
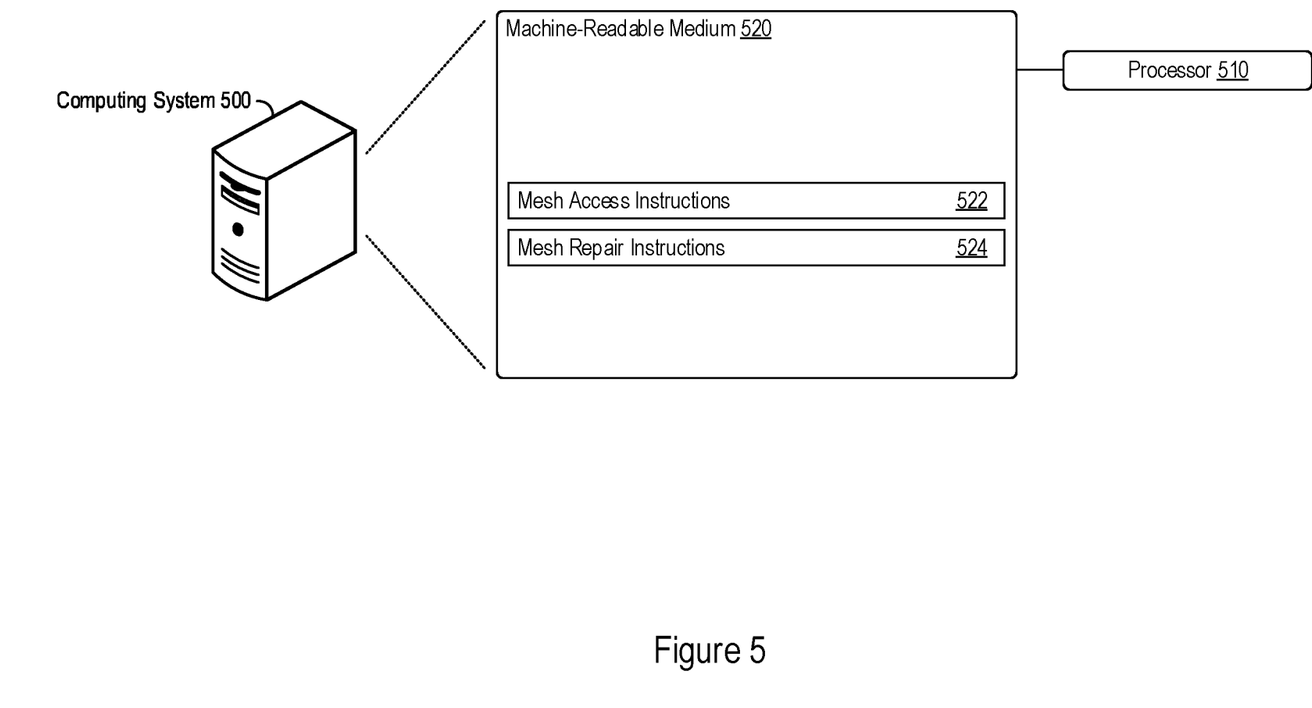
FIG. 5 shows an example of a computing system that supports spatial decomposition-based repair of defects in boundary representations.

FIG. 5 shows an example of a computing system 500 that supports spatial decomposition-based repair of defects in boundary representations. The computing system 500 may include a processor 510, which may take the form of a single or multiple processors. The processor(s) 510 may include a central processing unit (CPU), microprocessor, or any hardware device suitable for executing instructions stored on a machine-readable medium. The system 500 may include a machine-readable medium 520. The machine-readable medium 520 may take the form of any non-transitory electronic, magnetic, optical, or other physical storage device that stores executable instructions, such as the mesh access instructions 522 and the mesh repair instructions 524 shown in FIG. 5. As such, the machine-readable medium 520 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 500 may execute instructions stored on the machine-readable medium 520 through the processor 510. Executing the instructions (e.g., the mesh access instructions 522 and/or the mesh repair instructions 524) may cause the computing system 500 to perform any of the spatial decomposition-based repair features described herein, including according to any of the features with respect to the mesh access engine 108, the mesh repair engine 110, or a combination of both.

For example, execution of the mesh access instructions 522 by the processor 510 may cause the computing system 500 to access a boundary representation of an object design, the boundary representation including a defect. Execution of the mesh repair instructions 524 by the processor 510 may cause the computing system 500 to repair the boundary representation, including by converting the boundary representation into a spatial decomposition representation of the object design as well as converting the spatial decomposition representation of the object design back into a boundary representation form to obtain a repaired boundary representation of the object design.

Any additional or alternative features as described herein may be implemented via the mesh access instructions 522, mesh repair instructions 524, or a combination of both.

The systems, methods, devices, and logic described above, including the mesh access engine 108 and the mesh repair engine 110, may be implemented in many different ways in many different combinations of hardware, logic, circuitry, and executable instructions stored on a machine-readable medium. For example, the mesh access engine 108, the mesh repair engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any of the described features for the mesh access engine 108, the mesh repair engine 110, or combinations thereof.

The processing capability of the systems, devices, and engines described herein, including the mesh access engine 108 and the mesh repair engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:
1. A method comprising:
by a computing system:
accessing a boundary representation of an object design, the boundary representation including a defect; and
repairing the boundary representation without determining a location of the defect in the boundary representation, including by:
converting the boundary representation into a spatial decomposition representation of the object design; and converting the spatial decomposition representation of the object design back into a boundary representation form to obtain a repaired boundary representation of the object design.

2. The method of claim 1, comprising repairing the boundary representation without expressly identifying the defect in the boundary representation.

3. The method of claim 1, wherein the defect comprises a slit defect with size smaller than a mesh resolution of the boundary representation, an inconsistently oriented facet, a non-manifold facet, overlapping facets, or any combination thereof.

4. The method of claim 3, comprising removing the defect from the object design through the converting of the boundary representation into the spatial decomposition representation.

5. The method of claim 1, wherein the boundary representation and the repaired boundary representation have different mesh facet layouts.

6. The method of claim 1, comprising converting the spatial decomposition representation of the object design into the repaired boundary representation at a different mesh resolution from the boundary representation.

7. A system comprising:
   a mesh access engine configured to access a boundary representation of an object design, the boundary representation including a defect; and
   a mesh repair engine configured to repair the boundary representation without determining a location of the defect in the boundary representation, including by:
      converting the boundary representation into a spatial decomposition representation of the object design; and
      converting the spatial decomposition representation of the object design back into a boundary representation form to obtain a repaired boundary representation of the object design.

8. The system of claim 7, wherein the mesh repair engine is configured to repair the boundary representation without expressly identifying the defect in the boundary representation.

9. The system of claim 7, wherein the defect comprises a slit defect with size smaller than a mesh resolution of the boundary representation, an inconsistently oriented facet, a non-manifold facet, overlapping facets, or any combination thereof.

10. The system of claim 9, wherein the mesh repair engine is configured to remove the defect from the object design through the converting of the boundary representation into the spatial decomposition representation.

11. The system of claim 7, wherein the boundary representation and the repaired boundary representation have different mesh facet layouts.

12. The system of claim 7, wherein the mesh repair engine is configured to convert the spatial decomposition representation of the object design into the repaired boundary representation at a different mesh resolution from the boundary representation.

13. A non-transitory machine-readable medium comprising instructions that, when executed by a processor, cause a computing system to:
   access a boundary representation of an object design, the boundary representation including a defect; and
   repair the boundary representation without determining a location of the defect in the boundary representation, including by:
      converting the boundary representation into a spatial decomposition representation of the object design; and
      converting the spatial decomposition representation of the object design back into a boundary representation form to obtain a repaired boundary representation of the object design.

14. The non-transitory machine-readable medium of claim 13, wherein the instructions, when executed, cause the computing system to repair the boundary representation without expressly identifying the defect in the boundary representation.

15. The non-transitory machine-readable medium of claim 13, wherein the defect comprises a slit defect with size smaller than a mesh resolution of the boundary representation, an inconsistently oriented facet, a non-manifold facet, overlapping facets, or any combination thereof.

16. The non-transitory machine-readable medium of claim 15, wherein the instructions, when executed, cause the computing system to remove the defect from the object design through the converting of the boundary representation into the spatial decomposition representation.

17. The non-transitory machine-readable medium of claim 13, wherein the boundary representation and the repaired boundary representation have different mesh facet layouts.

18. The non-transitory machine-readable medium of claim 13, wherein the instructions, when executed, cause the computing system to convert the spatial decomposition representation of the object design into the repaired boundary representation at a different mesh resolution from the boundary representation.

* * * * *